(12) United States Patent
Walter et al.

(10) Patent No.: US 7,296,957 B2
(45) Date of Patent: Nov. 20, 2007

(54) METHODS AND APPARATUS FOR COUPLING GAS TURBINE ENGINE COMPONENTS

(75) Inventors: Benjamin Lee Walter, Liberty Township, OH (US); Charles Thomas McMillan, Liberty Township, OH (US); Bradley Frank Anastasia, Loveland, OH (US); Jeffrey Lee Mason, Sharonville, OH (US); Steven Alan Ross, Cincinnati, OH (US); Michael John Vukelich, Morrow, OH (US)

(73) Assignee: General Electric Company, Schenectady, NY (US)

( * ) Notice: Subject to any disclaimer, the term of this patent is extended or adjusted under 35 U.S.C. 154(b) by 55 days.

(21) Appl. No.: 10/840,776

(22) Filed: May 6, 2004

(65) Prior Publication Data

US 2007/0212194 A1    Sep. 13, 2007

(51) Int. Cl.
*F16B 37/02* (2006.01)
*F16B 37/04* (2006.01)

(52) U.S. Cl. .................... 411/175; 411/113; 411/183

(58) Field of Classification Search ........ 411/172–175, 411/223–224, 166, 181, 180, 183, 113
See application file for complete search history.

(56) References Cited

U.S. PATENT DOCUMENTS

| | | | | |
|---|---|---|---|---|
| 924,398 | A * | 6/1909 | Stevens | 73/322.5 |
| 1,112,525 | A * | 10/1914 | Darling | 248/187.1 |
| 1,142,647 | A * | 6/1915 | Watts | 411/223 |
| 1,322,624 | A * | 11/1919 | Rosenblatt | 351/141 |
| 1,706,648 | A * | 3/1929 | Blaskewitz et al. | 16/444 |
| 1,813,968 | A * | 7/1931 | Simons | 411/183 |
| 2,026,757 | A * | 1/1936 | Swanstrom | 411/180 |
| 2,102,554 | A * | 12/1937 | Churchill | 411/173 |
| 2,359,031 | A * | 9/1944 | Goshia | 411/183 |
| 2,409,907 | A * | 10/1946 | Shakesby et al. | 285/148.25 |
| 3,056,443 | A * | 10/1962 | Knocke | 411/186 |
| 3,124,408 | A * | 3/1964 | Oesterreicher | 439/741 |
| 3,133,579 | A * | 5/1964 | Grimm et al. | 411/180 |
| 3,315,721 | A * | 4/1967 | Koehl | 411/173 |
| 3,405,752 | A * | 10/1968 | Neuschotz | 411/180 |
| 3,495,643 | A * | 2/1970 | Dey et al. | 411/113 |
| 3,695,324 | A * | 10/1972 | Gulistan | 411/111 |
| 3,910,331 | A * | 10/1975 | Randall | 411/181 |
| 3,935,787 | A * | 2/1976 | Fisher | 411/16 |

(Continued)

*Primary Examiner*—Robert J. Sandy
*Assistant Examiner*—Jeffrey A. Sharp
(74) *Attorney, Agent, or Firm*—William Scott Andes; Armstrong Teasdale LLP

(57) ABSTRACT

A method facilitates assembling a gas turbine engine assembly including at least a first member and a second member. The method comprises inserting a threaded fastener through an opening formed in a flange, and providing at least one shank nut including a flanged mating end, an opposite non-mating end, and a body extending therebetween. The body includes an internal surface, an external surface, and a centerline extending between the body ends. The flanged mating end includes a substantially planar exterior surface that is aligned perpendicularly to the centerline and an annular groove that extends from the exterior surface at least partially towards the non-mating end. The method also comprises securing the assembly together such that the mating end is positioned flush against the flange and such that the threaded fastener extends at least partially into a bore extending through the shank nut and defined by the shank nut internal surface.

11 Claims, 2 Drawing Sheets

U.S. PATENT DOCUMENTS

| | | | | |
|---|---|---|---|---|
| 4,186,787 | A * | 2/1980 | Husain | 411/183 |
| 4,295,766 | A * | 10/1981 | Shaw | 411/113 |
| 4,557,650 | A * | 12/1985 | Molina | 411/108 |
| 4,652,169 | A * | 3/1987 | Matthews | 403/261 |
| 4,730,967 | A * | 3/1988 | Warkentin | 411/103 |
| 4,732,518 | A * | 3/1988 | Toosky | 411/181 |
| 4,820,475 | A * | 4/1989 | Mayers et al. | 376/327 |
| 4,919,578 | A * | 4/1990 | Zeigler et al. | 411/113 |
| 4,929,137 | A * | 5/1990 | Bossenmaier | 411/501 |
| 4,957,412 | A * | 9/1990 | Olson et al. | 415/189 |
| 5,020,952 | A * | 6/1991 | Zeigler et al. | 411/113 |
| 5,267,832 | A * | 12/1993 | Johnson et al. | 415/115 |
| 5,528,812 | A * | 6/1996 | Muller | 29/432.2 |
| 5,618,161 | A * | 4/1997 | Papageorgiou et al. | 415/190 |
| 5,626,450 | A * | 5/1997 | Ferrari et al. | 411/510 |
| 5,630,686 | A * | 5/1997 | Billmann | 411/112 |
| 5,803,644 | A * | 9/1998 | Bravo et al. | 403/185 |
| 5,853,285 | A * | 12/1998 | Miller et al. | 416/96 R |
| 5,927,921 | A * | 7/1999 | Hukari | 411/427 |
| 6,161,998 | A * | 12/2000 | Brown | 411/34 |
| 6,318,940 | B1 * | 11/2001 | Mitts | 411/188 |
| 6,457,924 | B1 * | 10/2002 | Wallace | 411/112 |
| 6,457,942 | B1 | 10/2002 | Forrester | |
| 6,537,022 | B1 * | 3/2003 | Housley et al. | 415/189 |
| 6,648,592 | B2 * | 11/2003 | Escure et al. | 415/115 |
| 6,688,830 | B2 * | 2/2004 | Kluting | 411/546 |
| 6,773,228 | B2 * | 8/2004 | Rainous et al. | 415/189 |
| 6,904,395 | B1 * | 6/2005 | DeJack et al. | 703/7 |
| 2003/0063961 | A1 * | 4/2003 | Lay | 411/181 |
| 2004/0042869 | A1 * | 3/2004 | Tucker | 411/172 |
| 2004/0115026 | A1 * | 6/2004 | Sommer et al. | 411/180 |

* cited by examiner

METHODS AND APPARATUS FOR COUPLING GAS TURBINE ENGINE COMPONENTS

BACKGROUND OF THE INVENTION

This invention relates generally to coupling assemblies, and, more particularly, to methods and apparatus for coupling gas turbine engine components together.

At least some known mechanical coupling assemblies used to couple gas turbine components together include a threaded fastener and a threaded connector. More specifically, within at least some known applications, the threaded fastener is inserted through an opening formed in a flange prior to a connector being threadably coupled to it for securing a component to the flange. At least some known flange openings are counter-bored to enable a portion of the threaded fastener to remain recessed with respect to an external surface of the flange after the fastener is coupled to the flange.

As the connector is threadably tightened to the fastener, clamping loading is induced to the flange. However, when counter-bored openings are used, at least a portion of the clamp loading induced to the flange is carried by the thinner portions of the flange that define the counter-bore. Over time, the uneven load pattern stresses induced within the flange may cause the edges of the fastener opening within the flange to roll inward and away from the threaded connector, in a condition known as "bolthole rolling." Bolthole rolling may cause additional stresses to be induced to the flange which over time may cause a premature failure of the flange.

BRIEF DESCRIPTION OF THE INVENTION

In one aspect, a method for assembling a gas turbine engine assembly including at least a first member and a second member is provided. The method comprises inserting at least one threaded fastener through a fastener opening formed in a flange extending from the first member, and providing at least one shank nut including a flanged mating end, an opposite non-mating end, and a body extending therebetween, wherein the body includes an internal surface, an external surface, and a centerline extending between the first and second ends, and wherein the flanged mating end includes a substantially planar exterior surface that is aligned perpendicularly to the centerline and an annular groove that extends from the exterior surface at least partially towards the non-mating end. The method also comprises securing the assembly together such that the flanged mating end is positioned flush against the flange and such that the threaded fastener extends at least partially into a bore extending through the shank nut and defined by the shank nut internal surface.

In another aspect, a shank nut for mating with a threaded mating component is provided. The nut includes a flanged mating end, an opposite non-mating end, and a body extending therebetween. The flanged mating end includes an exterior surface that is substantially planar. The body includes an internal surface, an external surface, and a centerline extending between the first and second ends. The internal surface defines a bore extending between the first and second ends. The bore is sized to receive at least a portion of the mating component therein. The mating end exterior surface is perpendicular to the body centerline and includes a groove extending at least partially circumferentially around the body bore. The groove extends axially from the mating end exterior surface at least partially towards the nut non-mating end.

In a further aspect, a coupling assembly for a gas turbine engine is provided. The coupling assembly includes a flange including at least one fastener opening extending therethrough, and a shank nut for mating with the threaded fastener. The at least one fastener opening is sized to receive at least a portion of a threaded fastener therethrough. The shank nut includes a flanged mating end, an opposite non-mating end, and a body extending therebetween. The flanged mating end includes a substantially planar exterior surface. The body includes an internal surface and an external surface. The body also includes a centerline extending between the first and second ends. The internal surface defines a bore extending between the first and second ends. The bore is substantially concentrically aligned with respect to the body and is sized to receive at least a portion of the threaded fastener therein. The mating end exterior surface is perpendicular to the body centerline and includes an annular groove extending generally axially from the mating end exterior surface and at least partially towards the shank nut non-mating end. The flange is coupled against the shank nut mating end.

DETAILED DESCRIPTION OF THE INVENTION

Figure 1:
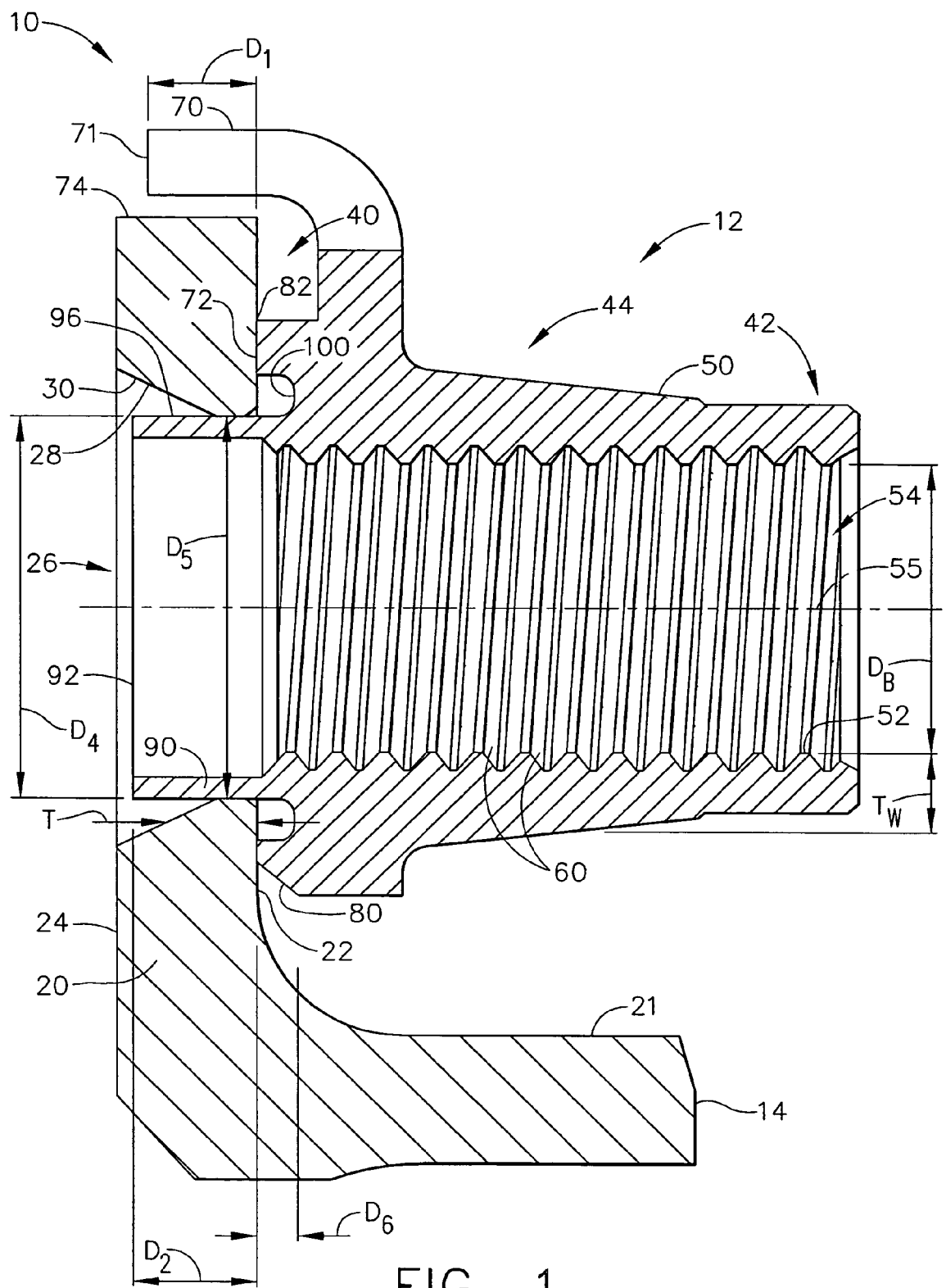
FIG. 1 a cross sectional view of a portion of an exemplary embodiment of a coupling assembly.
Figure 2:
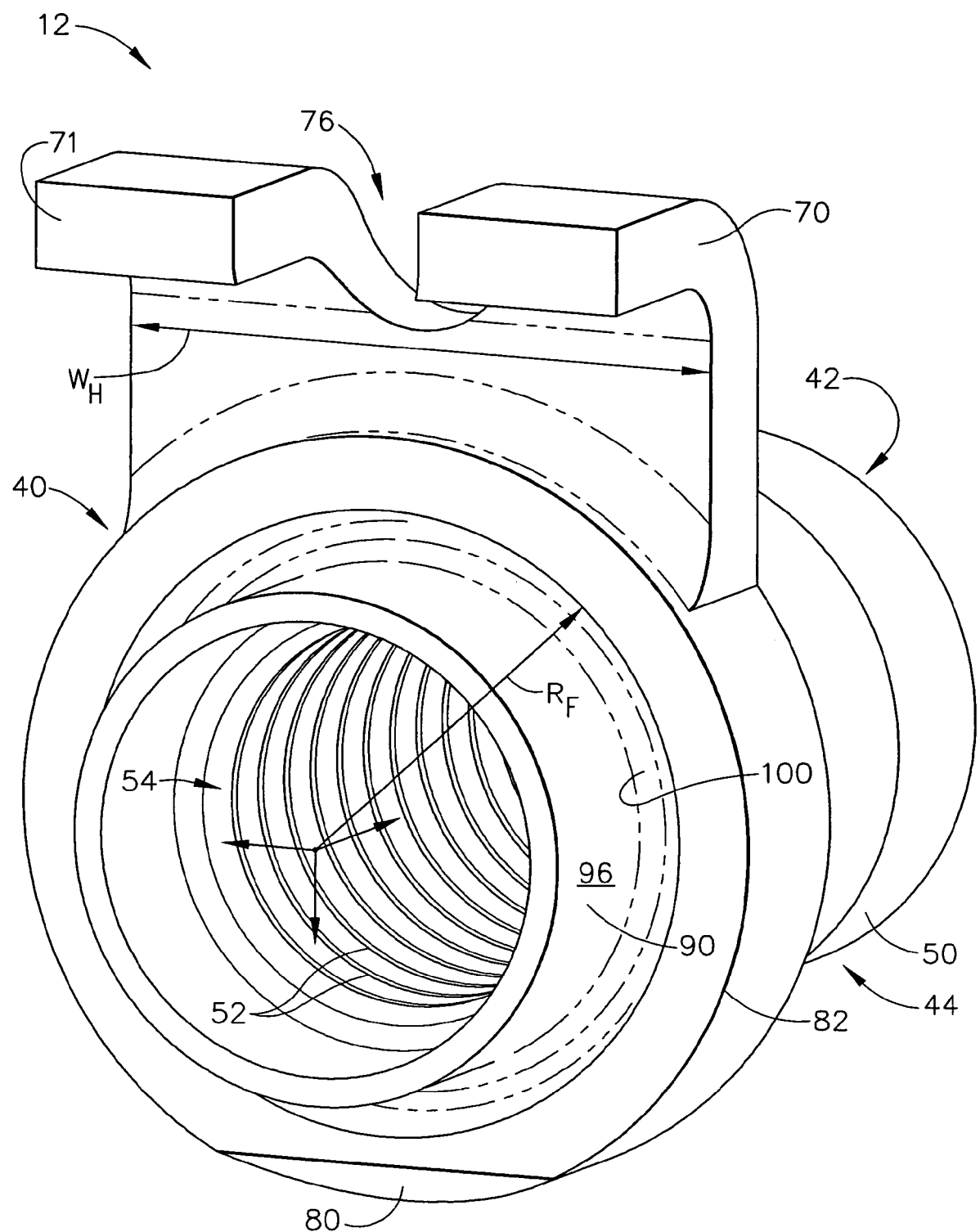
FIG. 2 is an enlarged perspective view of the threaded connector used with the coupling assembly shown in FIG. 1.

FIG. 1 a cross sectional view of a portion of an exemplary embodiment of a coupling assembly 10 including a threaded connector or shank nut 12. FIG. 2 is a perspective view of threaded connector 12 that is used with coupling assembly 10. Specifically, coupling assembly 10 includes at least one flange 20, shank nut 12, and a threaded fastener (not shown). In one embodiment, the threaded fastener is a threaded bolt that is threadably coupled to shank nut 12, as described in more detail below. Coupling assembly 10 is used to securely couple components together, such as gas turbine engine components. In the exemplary embodiment, coupling assembly 10 is used to couple adjacent mating portions of a rotor shaft 14 together. In one embodiment, rotor shaft 14 is a multi-piece rotor shaft that is used with a CF6-80 gas turbine engine commercially available from General Electric Aircraft Engines, Cincinnati, Ohio.

In the exemplary embodiment, each shaft portion 14 includes a coupling flange 20 that extends radially outward from an external surface 21 of shaft 14 to enable adjacent portions of shaft 14 to be coupled together. It should be noted that in FIG. 1, although only one shaft portion 14 is illustrated, each shaft portion 14 includes a coupling flange or other known coupling means, that enables shaft portions 14 to be coupled together. Flange 20 includes a mating surface 22, an opposite coupling surface 24, and at least one fastener opening 26 extending therebetween. In the exemplary embodiment, fastener opening 26 is extends through a counter-bored portion 28 of flange 20, such that a sidewall 30 defining counter-bored portion 28 and opening 26 is obliquely oriented with respect to surfaces 22 and 24. Accordingly, a thickness T of flange 20 measured between coupling surface 24 and a sidewall 30 is variable across counter-bored portion 28.

Shank nut 12 includes a flanged mating end 40, an opposite non-mating end 42, and a generally cylindrical body 44 extending therebetween. In the exemplary embodiment, body 44 has a substantially circular cross-sectional profile. In alternative embodiments, body 44 has other cross-sectional shapes. Body 44 has an external surface 50, an internal surface 52, and a centerline 53 that extends between ends 40 and 42. Internal surface 52 defines a bore 54 that extends between body ends 40 and 42. In the exemplary embodiment, bore 54 is concentrically aligned with respect to body 44 and has a diameter $D_B$ that is substantially constant through bore 54. Internal surface 52 is threaded and includes a plurality of threads 60 that extend between body ends 40 and 42. Diameter $D_B$ is sized to receive at least a portion of the threaded fastener therein.

In the exemplary embodiment, shank nut external surface 50 is tapered from flanged mating end 40 at least partially towards non-mating end 42, such that a wall thickness $T_W$ of body 40 measured between body surfaces 50 and 52 is at least partially variably between body ends 40 and 42. More specifically, in the exemplary embodiment, external surface 50 is tapered from a hook 70 extending from body 40 at least partially towards non-mating end 42.

In the exemplary embodiment, hook 70 extends radially outward from body 44 such that an outer end 71 of hook 70 is positioned a distance $D_1$ forward of an end surface 72 of mating end 40. Distance $D_1$ enables hook 70 to extend radially outward of an outer edge 74 of flange 20 such that hook 70 provides an anti-rotation feature to shank nut 12, as described in more detail below. In the exemplary embodiment, hook 70 includes a scallop 76 which enables shank nut 12 to be easily visually distinguishable from other threaded connectors. In alternative embodiments, shank nut 12 does not include hook 70.

A chamfer 80 is formed along mating end 40 at the edge 82 formed between body external surface 50 and end surface 72. In the exemplary embodiment, chamfer 80 is positioned diametrically opposite hook 70 and is formed substantially parallel to the width $W_H$ of hook 70 rather than following the circular arc of edge 82. Because of installation space limitations, in the exemplary embodiment, chamfer 80 enables shank nut 12 to be formed with a larger flange radius $R_F$ at mating end 40. In alternative embodiments, shank nut 12 does not include chamfer 80.

In the exemplary embodiment, shank nut 12 also includes a shank barrel 90 extending outward from mating end 40. Specifically, in the exemplary embodiment, shank barrel 90 is substantially cylindrical and extends a distance $D_2$ from end surface 72 to a outer edge 92. Distance $D_2$ enables shank barrel 90 to be swaged or outwardly flared such that shank nut 12 is retained in an axial direction against flange 20 during assembly by shank barrel 90, as is described in more detail below. Shank barrel 90 has a diameter $D_4$ defined by an outer surface 96 of shank barrel 90 that is smaller than an inner diameter $D_5$ of flange fastener opening 26 adjacent flange coupling surface 24.

A groove 100 is defined within mating end 40 and extends a distance $D_6$ axially inward from end surface 72. In the exemplary embodiment, groove 100 is annular and extends circumferentially around shank barrel 90 and bore 54. In an alternative embodiment, groove 100 extends only partially circumferentially around barrel 90. In another alternative embodiment, mating end 40 includes a plurality of grooves defined therein. As is described in more detail below, groove 100 facilitates redistributing clamping loading radially outward from shank nut centerline 54 when shank nut 12 is securely coupled in position.

During assembly of rotor shaft 14, initially shank nut 12 is positioned adjacent flange 20. Specifically, initially shank nut 12 is positioned such that shank nut mating end 40 is against flange coupling surface 24. Accordingly, shank barrel 90 extends at least partially through flange fastener opening 26. Shank barrel 90 is then swaged or flared using a known flaring tool such that shank barrel 90 is forced outwardly against flange fastener opening sidewall 30. Accordingly, once swaged, shank barrel 90 facilitates retaining shank nut 12 in an axial direction in position relative to, and against, flange 20.

A component to be coupled to rotor shaft 14 is then positioned adjacent shaft 14 such that a flange extending from that component is against the mating surface 22 of flange 20. A threaded fastener is then inserted through the first component flange and through flange 20. More specifically, as the fastener is extended through flange 20, the fastener is rotated to be threadably coupled to shank nut 12. Because hook 70 extends radially outward from an outer edge 74 of flange 20, hook 70 facilitates preventing nut 20 from rotating as the threaded fastener is torqued within nut 12.

Continued rotation of the fastener enables shank nut 12 to induce a clamping force to flange 20 such that the components of rotor shaft 14 are securely coupled together. More specifically, shank nut groove 100 facilitates redistributing clamping loading radially outward from shank nut centerline 54 such that the reaction loading is not induced through counter-bored portion 28, but rather is instead induced through a portion 100 of flange 20 that has a thickness $T_1$ that is thicker than that any thickness T measured within counter-bored portion 28. Moreover, the additional material thickness $T_1$ of flange portion 100 facilitates structurally enhancing the stiffness of flange 20 such that bolt rolling within flange fastener opening 26 is facilitated to be reduced as a result of groove 100. Furthermore, the tapering of shank nut external surface 50 facilitates enabling the clamp load to more easily pass between the nut threads 60 and mating surface 72.

After the threaded fastener has been securely coupled within shank nut 12, shank nut non-mating end 42 is crimped against the threaded fastener. Crimping end 42 facilitates preventing shank nut 12 from unthreading from the threaded fastener, such that end 42 provides a self-locking feature to nut 12.

The above-described coupling system is a cost-effective and reliable means for coupling components together. The shank nut includes an annular groove which displaces the mating surface of the nut radially outward, such that clamp loading is redistributed radially outward from the nut bore. Accordingly, the clamp loading is carried by a thicker portion of the mating flange such that stresses induced to the flange, and/or bolt rolling of the fastener opening within the flange, are facilitated to be reduced. As a result, the shank nut facilitates securely coupling components together in a cost-effective and reliable manner Exemplary embodiments of coupling assemblies are described above in detail. The assemblies are not limited to the specific embodiments described herein, but rather, components of each assembly may be utilized independently and separately from other components described herein. For example, each shank nut component can also be used in combination with other coupling assemblies.

While the invention has been described in terms of various specific embodiments, those skilled in the art will recognize that the invention can be practiced with modification within the spirit and scope of the claims.

What is claimed is:

1. A shank nut for mating with a threaded mating component, said nut comprising:
   a flanged mating end comprising an exterior surface, said exterior surface is substantially planar;
   an opposite non-mating end; and
   a body extending therebetween, said body comprising an internal surface and an external surface, said body further comprising a centerline extending between said mating end and said non-mating end, and an unthreaded shank barrel extending outward from said mating end in a direction away from said non-mating end, said internal surface defining a bore extending between said mating end and said non-mating end, said bore sized to receive at least a portion of the mating component therein, said mating end exterior surface is perpendicular to said body centerline and comprises a groove extending at least partially circumferentially around said body bore, said groove extends axially from said mating end exterior surface at least partially towards said nut non-mating end and said groove is defined radially outward from said shank barrel, said body further comprises a hook extending outward from said body external surface, said hook is a distance from said mating end, said body further comprising a chamfer, said chamfer extends substantially planarly along a chord of said mating end wherein at least a portion of said shank nut body is chamfered adjacent said mating end and diametrically opposite said hook with respect to said centerline.

2. A shank nut in accordance with claim 1 wherein said mating end groove facilitates redistributing reaction loading radially outward from said body bore when said nut is coupled to the mating component.

3. A shank nut in accordance with claim 1 wherein said mating end groove facilitates reducing an amount of bolthole rolling when said nut is coupled to the mating component.

4. A shank nut in accordance with claim 1 wherein said mating end exterior surface facilitates substantially even clamping loading across said mating end when said nut is coupled to the mating component.

5. A shank nut in accordance with claim 1 wherein said hook is configured to prevent said nut from rotating after said nut is coupled to the mating component.

6. A shank nut in accordance with claim 1 further comprising a shank barrel extending outward from said mating end, said shank barrel is configured to retain said nut to the mating component during coupling of said nut to the mating component.

7. A coupling assembly for a gas turbine engine, said coupling assembly comprises:
   a flange comprising at least one fastener opening extending therethrough, said at least one fastener opening sized to receive at least a portion of a threaded fastener therethrough; and
   a shank nut for mating with the threaded fastener, said shank nut comprising a flanged mating end, an opposite non-mating end, and a body extending therebetween, said flanged mating end comprising a substantially planar exterior surface, said body comprising an internal surface and an external surface, said shank nut further comprises a hook extending outward from said body external surface, said hook is a distance from said mating end, said body further comprising a centerline extending between said mating end and said non-mating end, and an unthreaded shank barrel extending outward from said mating end in a direction away from said non-mating end, said internal surface defining a bore extending between said mating end and said non-mating end, said bore substantially concentrically aligned with respect to said body and sized to receive at least a portion of the threaded fastener therein, said mating end exterior surface is perpendicular to said body centerline and comprises an annular groove extending generally axially from said mating end exterior surface at least partially towards said shank nut non-mating end, said flange coupled against said shank nut mating end and said groove is defined radially outward from said shank barrel, said body further comprising a chamfer, said chamfer extends substantially planarly along a chord of said mating end wherein at least a portion of said shank nut body is chamfered adjacent said mating end and diametrically opposite said hook with respect to said centerline.

8. A coupling assembly in accordance with claim 7 wherein said shank nut annular groove is configured to distribute reaction loading radially outward from said nut body bore when said nut is coupled to said flange.

9. A coupling assembly in accordance with claim 7 wherein said shank nut annular groove facilitates reducing an amount of reaction loading induced to said flange by said shank nut when said shank nut is coupled to said flange by the threaded fastener.

10. A coupling assembly in accordance with claim 7 wherein said hook facilitates preventing rotation of said nut when said shank nut is coupled to said flange by the threaded fastener.

11. A coupling assembly in accordance with claim 7 wherein said shank barrel is configured to be inserted at least partially through said flange fastener opening for retaining said shank nut to said flange during coupling of said nut to said flange.

* * * * *